J. JANSEN, Jr.
BRAKE ROD GUIDE.
APPLICATION FILED JULY 1, 1921.

1,433,823. Patented Oct. 31, 1922.

Jesse Jansen Jr. INVENTOR.

BY Francis C. Huebner, ATTORNEY.

Patented Oct. 31, 1922.

1,433,823

UNITED STATES PATENT OFFICE.

JESSE JANSEN, JR., OF FRESNO, CALIFORNIA.

BRAKE-ROD GUIDE.

Application filed July 1, 1921. Serial No. 481,831.

*To all whom it may concern:*

Be it known that JESSE JANSEN, Jr., a citizen of the United States, and resident of Fresno, in the county of Fresno and the State of California, has invented a new and useful Improvement in Brake-Rod Guides, of which the following is a specification.

My invention relates to a brake rod guide. It is well known that the brake rods on automobiles have an undue amount of vibration as at present constructed and that they frequently crystalize and break from such vibration.

The object of my invention is to hold the brake rods firmly, but permitting them to have a free lateral movement, and to permit them to move up and down simultaneously with the housing of the drive shaft.

Figure 1:
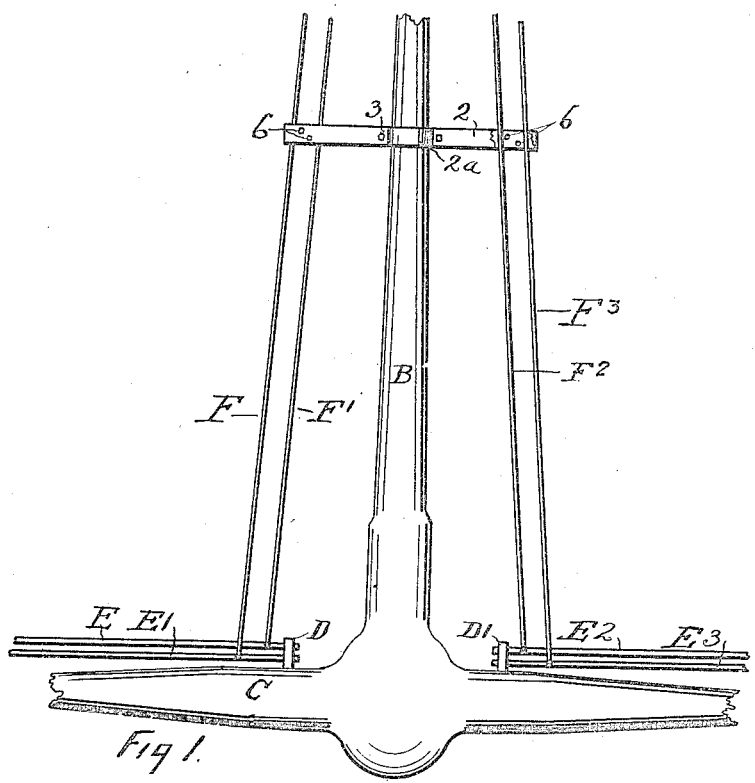
Figure 2:
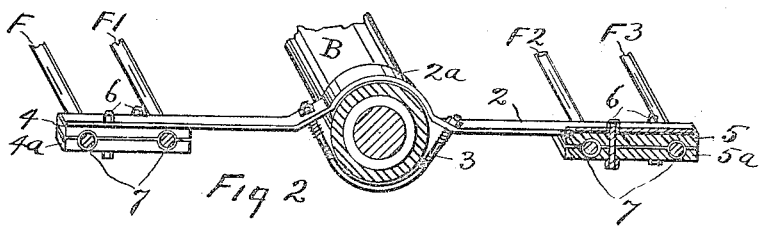

I accomplish these and other objects hereinafter disclosed by means of the device hereinafter described and illustrated on the accompanying drawing in which Figure 1 is a top view of my rod support attached to the drive shaft housing of an automobile and holding the brake rods. Figure 2 is an enlarged side view of the brace showing a cross sectional view of the rods and housing.

In said drawing, B is the housing of the drive shaft of an automobile, and C is the axle housing. The brackets, D and D¹ are supports for brake shafts E and E¹, E² and E³. The brake rods are designated as F, F¹, F², and F³. My invention consists of a bar, 2, having a portion of the center 2ª cupped so that it will fit over the drive shaft housing B. By means of a clamp 3, bar 2 is attached rigidly to the housing B. At each end of the bar 2 I have attached duplicate blocks 4 and 4ª, and 5 and 5ª, by means of bolts 6. Holes, 7, are made through the blocks alined with the brake rods, and of approximately the same size so that the rods can be moved laterally therein. These holes are made so that the line where the blocks join laterally, intersects the holes 7. This is to permit the brake rods to be inserted in the holes when the blocks are separated and the blocks are then bolted together as shown. In my construction the blocks are preferably made of fibre or other non-metallic substance, but they can be made of metal. It will be noted that the rods are thus held a spaced distance apart and prevented from vibrating.

Having described my invention, I claim as new and ask for letters patent.

1. In combination with an automobile chassis having a drive shaft housing and brake rods extending approximately parallel with the drive shaft housing of a bar adapted to be clamped at the approximate center thereof to the drive shaft housing, and extending beyond the brake rods, said bar having guide holes therethrough alined with the brake rods, and through which holes the brake rods pass.

2. In combination with the chassis of an automobile having a drive shaft housing and brake rods, of a brake rod support adapted to be clamped at its approximate center to the drive shaft housing, and guides at each end thereof adapted to slidingly hold said brake rods substantially as described.

3. In combination with the chassis of an automobile having a drive shaft housing and brake rods, of a brake rod support adapted to be clamped at its approximate center to the drive shaft housing, and having brake rod guides at each end thereof constructed of blocks having grooves therein adapted to form a slideway for each brake rod, said grooves being alined with the brake rods and means for clamping said blocks together and to the brake rod support, substantially as described.

4. In combination with the chassis of an automobile having a drive shaft housing and brake rods extending in the same general direction as said housing of a brake rod support adapted to be clamped to said housing and to extend beyond the brake rods, and guides adapted to encircle said rods attached to the support, substantially as described.

5. In combination with a chassis of an automobile having a drive shaft housing and brake rods extending in approximately the same general direction as said housing of a brake rod support attached to said housing, and blocks of fibre attached to each end of the support, said blocks having holes therethrough alined with the brake rods and adapted to slidingly hold said rods.

JESSE JANSEN, JR.